T. ROSE & O. JENNINGS.
TURBINE WATER-WHEEL.

No. 182,854. Patented Oct. 3, 1876.

Witnesses:
Morgan L. Webb
Benj. L. Webb

Inventors:
Timothy Rose
Oscar Jennings

UNITED STATES PATENT OFFICE.

TIMOTHY ROSE, OF CORTLAND VILLAGE, AND OSCAR JENNINGS, OF DANBY, NEW YORK.

IMPROVEMENT IN TURBINE WATER-WHEELS.

Specification forming part of Letters Patent No. 182,854, dated October 3, 1876; application filed June 28, 1876.

*To all whom it may concern:*

Be it known that we, TIMOTHY ROSE, of Cortland Village, Cortland county, and State of New York, and OSCAR JENNINGS, of the town of Danby, in Tompkins county and State of New York, have jointly invented new and useful Improvements in Turbine Water-Wheels and fixtures, which improvements are fully set forth in the following specification, reference being had to the accompanying drawings.

The object of our invention is to provide an easy way of turning on shutting off the water from the wheel, and of regulating the amount of water supplied to the wheel; and also, whenever the wheel settles by wearing, of easily raising it so as to prevent material leakage of water from between the upper part of the wheel and the deck.

Our invention is designed to be used in connection with a turbine water-wheel mounted horizontally upon a vertical shaft, with deck and gate above the wheel.

Figure 1:
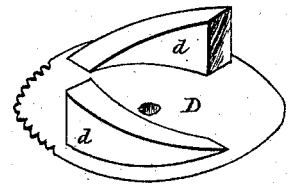
Figure 2:
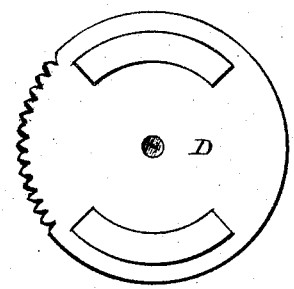
Figure 3:
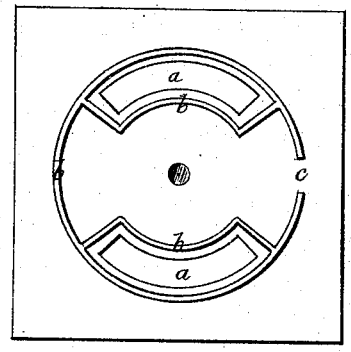
Figure 4:

In the drawing, Figure 1 is a detached view of the gate. Fig. 2 is a view of the gate with chutes detached, showing the openings to correspond with the openings in the deck-plate. Fig. 3 is a detached view of the deck-plate. Fig. 4 is a view of the base-support and the lower part of the shaft upon which the wheel is mounted.

The wheel is mounted so as to revolve horizontally upon the vertical shaft A. B represents the deck-plate, resting upon the bottom of the flume. D represents the gate with chutes. E represents the step-block, which contains the step-box and step forming the base, to receive and support the wheel-shaft at its lower end. The deck-plate has ports or openings $a\ a$, through which the water flows upon the wheel. The deck-plate is provided with flanges $b\ b$, raised about one inch from its surface, passing around in a circle above the wheel, with a small opening, $c$, and completely surrounding the openings $a\ a$ in the deck-plate. The gate D is a circular plate resting upon the flanges of the deck-plate, and provided with chutes $d\ d$, permanently attached to correspond with and match the openings $a\ a$ in the deck-plate. The water flows through these chutes and the ports of the deck-plate upon the wheel.

By means of cogs and a cog-wheel upon one side of the gate, the gate may be easily turned to let on and shut off the water, and to regulate the amount desired to be supplied.

Through the opening $c$ of the circling flange water is admitted under the gate, thus preventing adhesion, by atmospheric pressure, of the gate and deck-plate, and permitting the gate to turn easily upon the flanges.

For the base-support of the shaft the step-block E, consisting of a heavy stick of timber, is placed upon and fastened to the apron. This block is cut away comparatively thin at both ends, so as to admit of an easy and free flow of the water under the wheel, but the portion near the center is left thick and large. This is mortised out from the top, and into it the step-box and step are fitted. A mortised opening, $e$, is cut through the step-block from one side, at the bottom of the step-box, which exposes the lower part of the step $f$. The base of the step is not made square, being longer upon one side than the other, so that a wedge may be inserted in the opening $e$, and driven under the step $f$.

Whenever the shaft and wheel settle by wearing, a space is left between the upper rim of the wheel and the deck, thus causing leakage and waste of water, which should flow through the wheel. To obviate this difficulty a wedge, $g$, may be driven under the step $f$, in the opening $e$, whenever necessary, which raises the wheel and keeps it close up to the deck in its proper position.

This mode of mounting the wheel and providing for the raising of the same by means of a wedge is much superior to any other mode in use.

Ordinarily, for want of a means of raising the wheel, it is allowed to wear away until the bulk of the water is wasted by leakage, and then the whole base is taken away and built over new, which is attended with much expense and delay.

We claim—

1. In combination with a water-wheel, the deck-plate B, with ports $a$ $a$ and flanges $b$ $b$, and the circular gate D, with chutes $d$ $d$, made substantially as and for the purposes above described.

2. In combination with a water-wheel, the step-block E, step $f$, and wedge $g$, all combined and arranged substantially as and for the purposes above described.

TIMOTHY ROSE.
OSCAR JENNINGS.

Witnesses:
MORGAN L. WEBB,
BENJ. L. WEBB.